United States Patent
Lin

(10) Patent No.: US 6,373,471 B1
(45) Date of Patent: Apr. 16, 2002

(54) KEYBOARD WITH INTERCHANGEABLE CONNECTION FUNCTION

(75) Inventor: Hsien Ming Lin, Taipei (TW)

(73) Assignee: Silitek Corporation, Taipei (TW)

( * ) Notice: Subject to any disclaimer, the term of this patent is extended or adjusted under 35 U.S.C. 154(b) by 0 days.

(21) Appl. No.: 09/464,480

(22) Filed: Dec. 16, 1999

(51) Int. Cl.⁷ ................................. G09G 5/00
(52) U.S. Cl. ................... 345/168; 341/22; 341/708; 341/140
(58) Field of Search .................. 345/156, 157, 345/163, 168, 169, 172; 341/20, 22; 463/37, 38; 400/472, 486, 492; 708/140

(56) References Cited

U.S. PATENT DOCUMENTS 5,144,302 A * 9/1992 Carter et al. ............. 345/168
5,865,546 A * 2/1999 Ganthier et al. .......... 345/168
6,317,061 B1 * 11/2001 Batra et al. ............... 345/168

* cited by examiner

Primary Examiner—Dennis-Doon Chow
(74) Attorney, Agent, or Firm—Rosenberg, Klein & Lee

(57) ABSTRACT

A keyboard with interchangeable connection specification, comprises an input/output circuit board for DIN, PS/2 or USB connection specification and replaceably assembled within a main body of the keyboard. The input/output circuit board has signal transmitting end connected to the signal receiving end of a membrane circuit of the keyboard. The keyboard further comprises an openable cover on a panel of the main body of said keyboard and corresponding to the location of the input/output circuit board. The openable cover is opened to replace the input/output circuit board mounted within the keyboard for required connection specification.

3 Claims, 4 Drawing Sheets

KEYBOARD WITH INTERCHANGEABLE CONNECTION FUNCTION

FIELD OF THE INVENTION

The present invention relates to a keyboard, especially to a keyboard with interchangeable connection function, which can be compatible with PS/2 keyboard or USB keyboard and has produce flexibility.

BACKGROUND OF THE INVENTION

The conventional keyboard generally has a built-in processor connected to the CPU of the computer through USB (universal serial bus) connector or PS/2 connector. Moreover, the built-in processor of the wireless keyboard communicates the CPU of the computer through IR (infrared) or RF (radio frequency) module. However, the processor of all keyboards are built in therein, the stock of spare parts is serious problem when large amount and various kind of keyboards (PS/2, IR, RF) are to be produced.

It is the object of the present invention to provide a keyboard with interchangeable connection function, wherein the connection specification of the keyboard can be changed by replacing an I/O circuit board assembled herein. Therefore, the stock amount of keyboard main body can be reduced.

To achieve the above object, the present invention provides a keyboard with interchangeable connection specification, comprises an input/output circuit board for DIN, PS/2 or USB connection specification and replaceably assembled within a main body of the keyboard. The input/output circuit board has signal transmitting end connected to the signal receiving end of a membrane circuit of the keyboard. The keyboard further comprises an openable cover on a panel of the main body of said keyboard and corresponding to the location of the input/output circuit board. The openable cover is opened to replace the input/output circuit board mounted within the keyboard for required connection specification.

The various objects and advantages of the present invention will be more readily understood from the following detailed description when read in conjunction with the appended drawing, in which:

DETAILED DESCRIPTION OF THE PREFERRED EMBODIMENT

Figure 1:
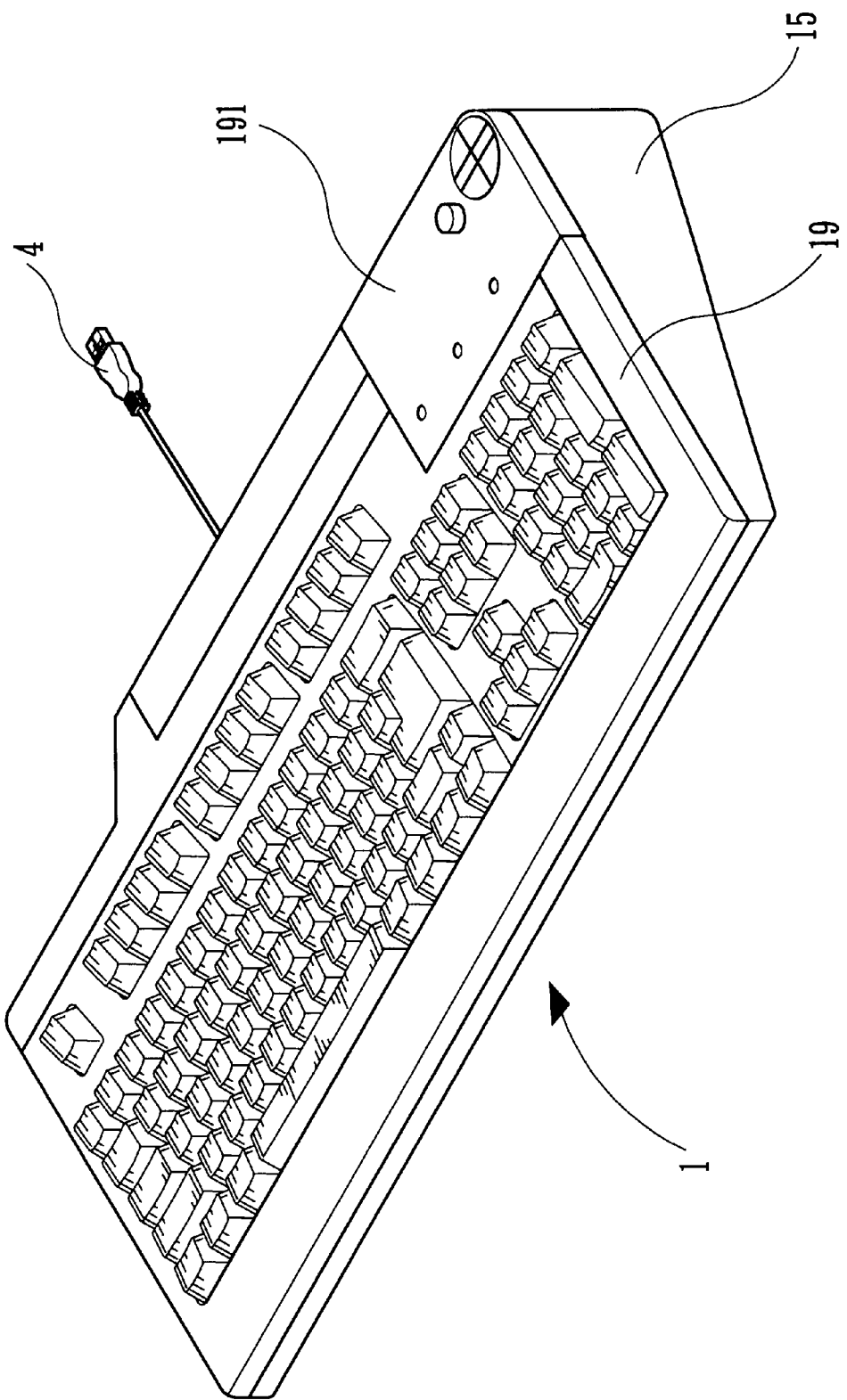
FIG. 1 is the perspective view of the present invention.
Figure 2:
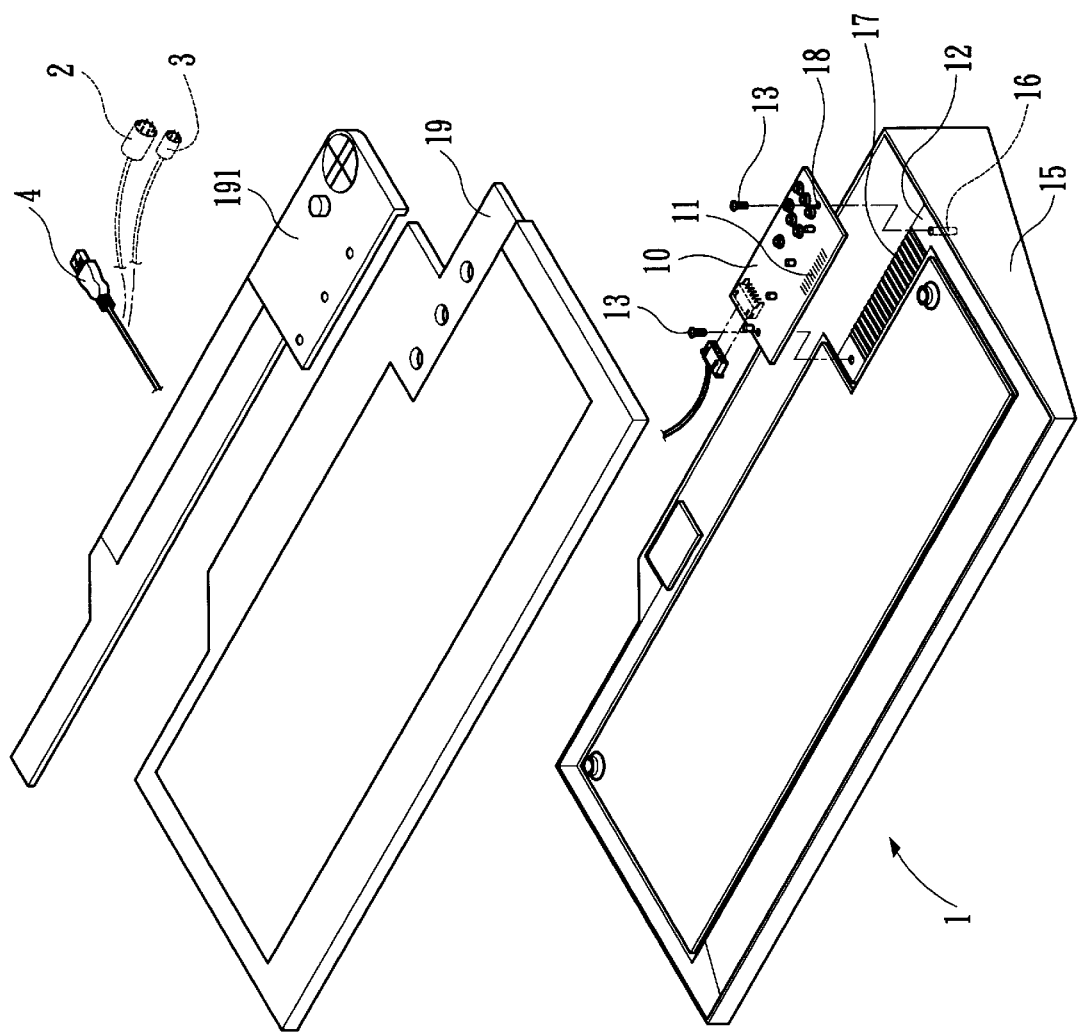
FIG. 2 is the exploded view of the present invention.
Figure 3:
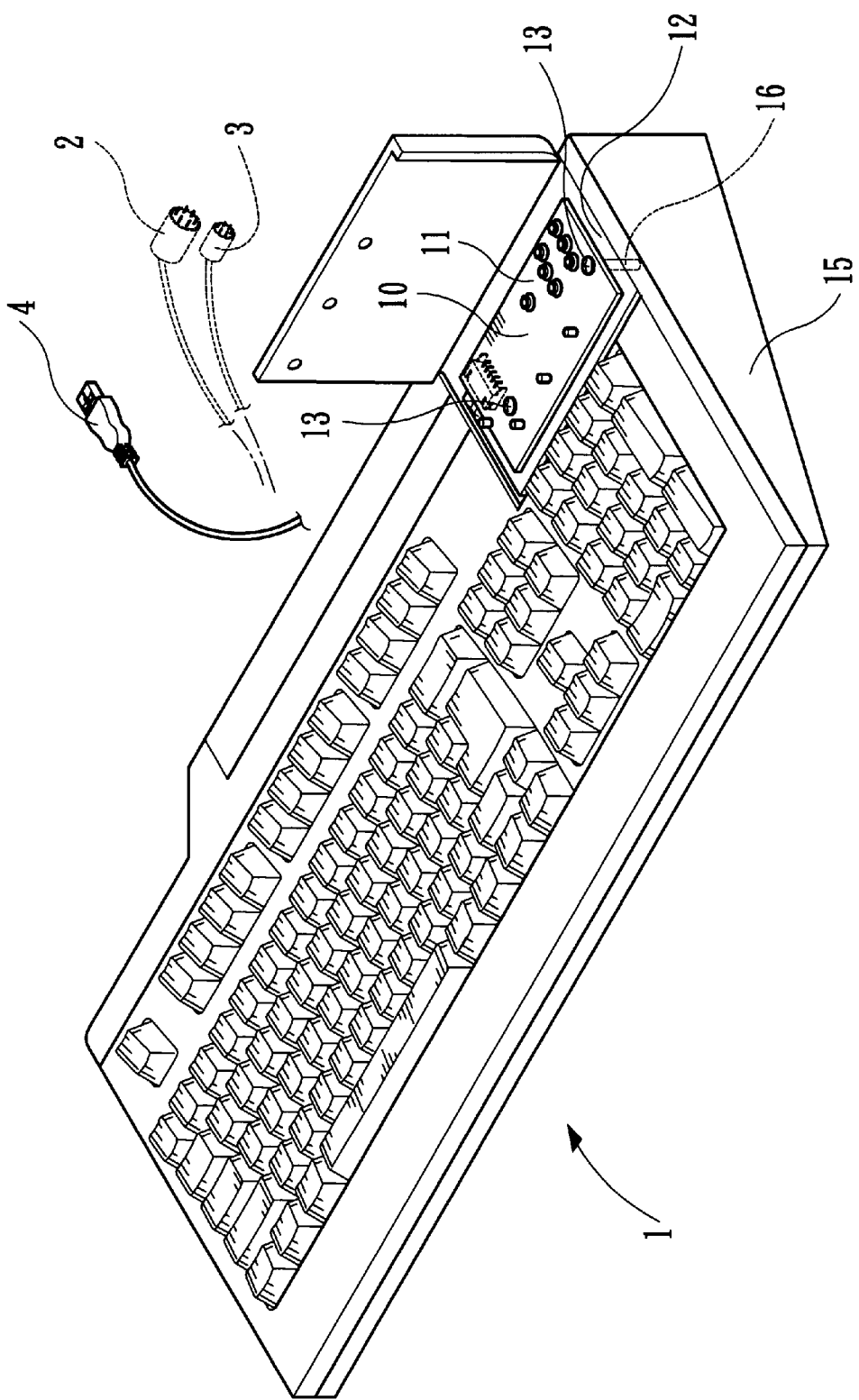
FIG. 3 is the sectional view of the present invention.
Figure 4:
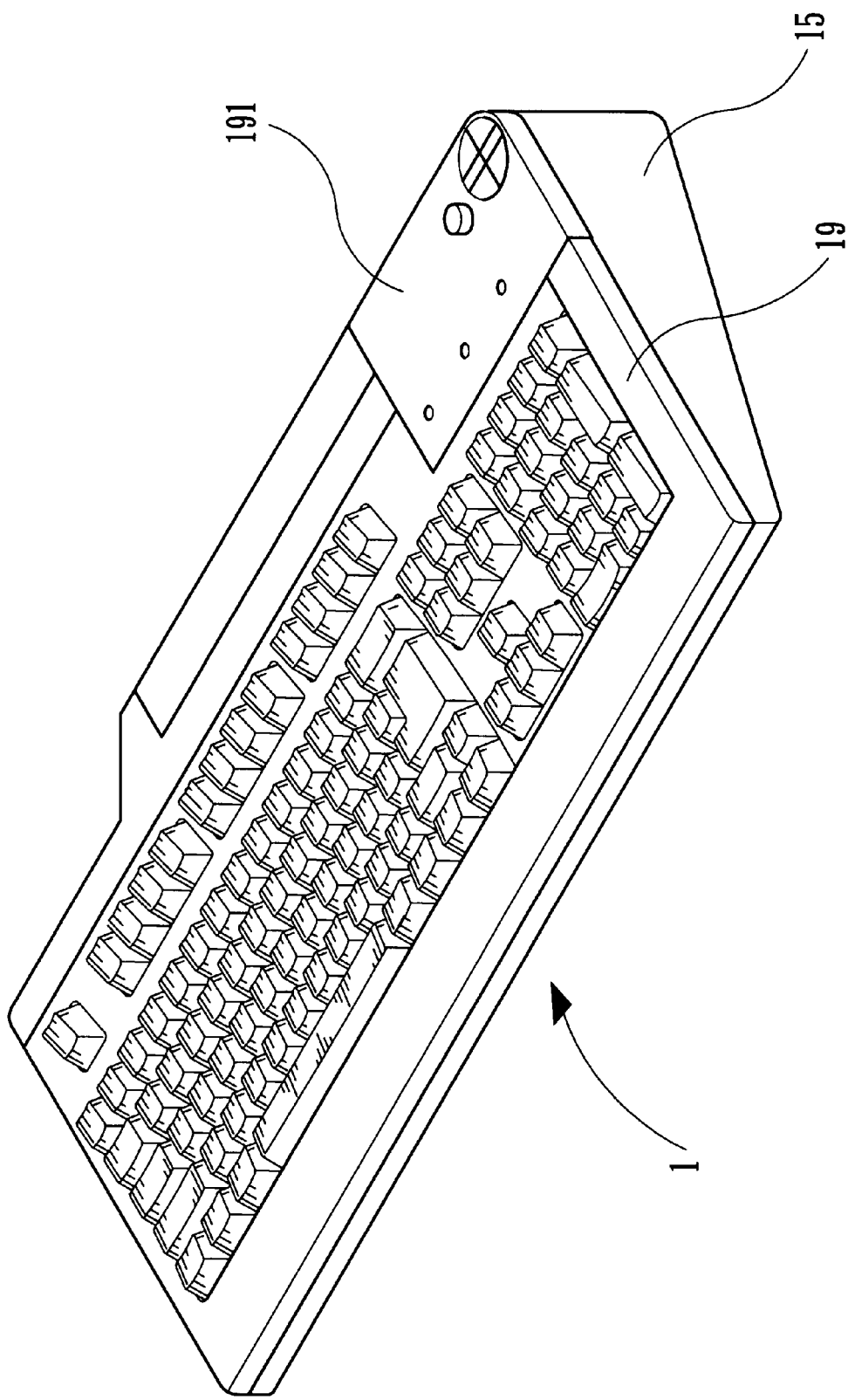
FIG. 4 is the perspective view of another embodiment of the present invention.

As shown in FIGS. 1 to 4, the present invention provides a keyboard 1 with interchangeable function. The I/O circuit board 10 of the keyboard 1 has a wired or wireless signal transmitting circuit of DIN specification (connection line 2), PS/2 specification (connection line 3) or USB specification (connection line 4). The I/O circuit board 10 of the keyboard 1 is assembled within the keyboard 1 by locking and has a gold-finger portion 11 connected to the gold-finger portion 17 on the membrane circuit 12 of the keyboard 1. Moreover, the I/O circuit board 10 is secured to the- keyboard I by locking two screws 13, through two through holes 18 of the I/O circuit board 10, two through holes on the membrane circuit 12 and two through holes on the plate 14, on two threaded poles 16 on the bottom plate 15 of the keyboard 1. Therefore, the I/O circuit board 10 of the keyboard I can be easily replaced according to the required connection specification (DIN, PS/2 or USB). The spare amount for the main body of keyboard can be advantageously reduced and the stock problem can be alleviated. The panel 19 of the keyboard main body corresponding to the I/O circuit board 10 has an openable cover 191 to facilitate the replacement of the I/O circuit board 10. The openable cover 191 has a retaining plate 192 to retain the openable cover 191. Therefore, to replace I/O circuit board 10 of another connection specification, the manufacture only need to open the cover 191 and replace the I/O circuit board 10 and the corresponding signal line. For example, FIG. 4 shows the signal line of wireless keyboard. Moreover, the mounting manner of the openable cover 191 and the I/O circuit board 10 is not restricted. The I/O circuit board 10 is not restricted to gold-finger connection, it can also be connected through connector connected to corresponding contacts on the membrane circuit.

With the present invention, the keyboard manufacturers do not need to stock lots amount of keyboard main body of various connection specifications. The-y can store keyboard main body of same specification and I/O circuit board 10 of various connection specifications. They only need to assemble the I/O circuit board 10 of required connection specification to the keyboard main body for a specific order. Moreover, to the consumer end, they can easily change their keyboard to another connection specification by changing I/O circuit board 10 of required connection specification and associated connection line.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A keyboard with interchangeable connection specification, comprising:

an input/output circuit board for DIN, PS/2 or USB connection specification; said input/output circuit board replaceably assembled within a main body of said keyboard and having signal transmitting end connected to the signal receiving end of a membrane circuit of said keyboard;

an openable cover on a panel of said main body of said keyboard and corresponding to the location of said input/output circuit board;

wherein said openable cover is opened to replace said input/output circuit board mounted within said keyboard for required connection specification.

2. The keyboard with interchangeable connection specification as in claim 1, wherein said connection specification is wired connection.

3. The keyboard with interchangeable connection specification as in claim 1, wherein said connection specification is wireless connection.

* * * * *